United States Patent
Wang

(10) Patent No.: US 9,084,910 B1
(45) Date of Patent: Jul. 21, 2015

(54) CONTROL ARRANGEMENT OF AN EXERCISE EQUIPMENT

(71) Applicant: Leao Wang, Taichung (TW)

(72) Inventor: Leao Wang, Taichung (TW)

( * ) Notice: Subject to any disclaimer, the term of this patent is extended or adjusted under 35 U.S.C. 154(b) by 0 days.

(21) Appl. No.: 14/148,694

(22) Filed: Jan. 6, 2014

(51) Int. Cl.
*A63B 24/00* (2006.01)

(52) U.S. Cl.
CPC ..... *A63B 24/0075* (2013.01); *A63B 2024/0078* (2013.01); *A63B 2220/00* (2013.01); *A63B 2230/00* (2013.01)

(58) Field of Classification Search
None
See application file for complete search history.

(56) References Cited

U.S. PATENT DOCUMENTS

| | | | |
|---|---|---|---|
| 7,594,873 B2* | 9/2009 | Terao et al. | 482/1 |
| 8,000,822 B2* | 8/2011 | Shirai et al. | 700/94 |
| 8,818,496 B2* | 8/2014 | Dziubinski et al. | 600/523 |
| 2005/0004436 A1* | 1/2005 | Nissila et al. | 600/300 |
| 2014/0377729 A1* | 12/2014 | Yuen et al. | 434/236 |
| 2015/0066173 A1* | 3/2015 | Ellis et al. | 700/91 |

* cited by examiner

*Primary Examiner* — Glenn Richman

(57) ABSTRACT

A control arrangement of an exercise equipment comprising at least one apparatus for measuring the physiological data, a portable electronic unit, and an electric exercise apparatus. The apparatus for measuring the physiological data includes a data output unit. The portable electronic unit includes a data transmission unit having the input/output function. An exercise management APP-program is built in the portable electronic unit. The exercise apparatus includes an electronic control panel with a data transmission unit and a corresponding exercise management APP-program. Once the apparatus for measuring the physiological data gets the basic physiological data (such as weight or heart rate) of a certain person, these will be immediately transmitted to the portable electronic unit. Meanwhile, an extra exercise session for the certain person will be created by the exercise management APP-program built within the portable electronic unit according to the personal physiological parameters. Thereafter, the extra exercise session will be transmitted to the electronic control panel so that the electronic control panel can control the exercise apparatus to run the above-mentioned exercise session.

2 Claims, 1 Drawing Sheet

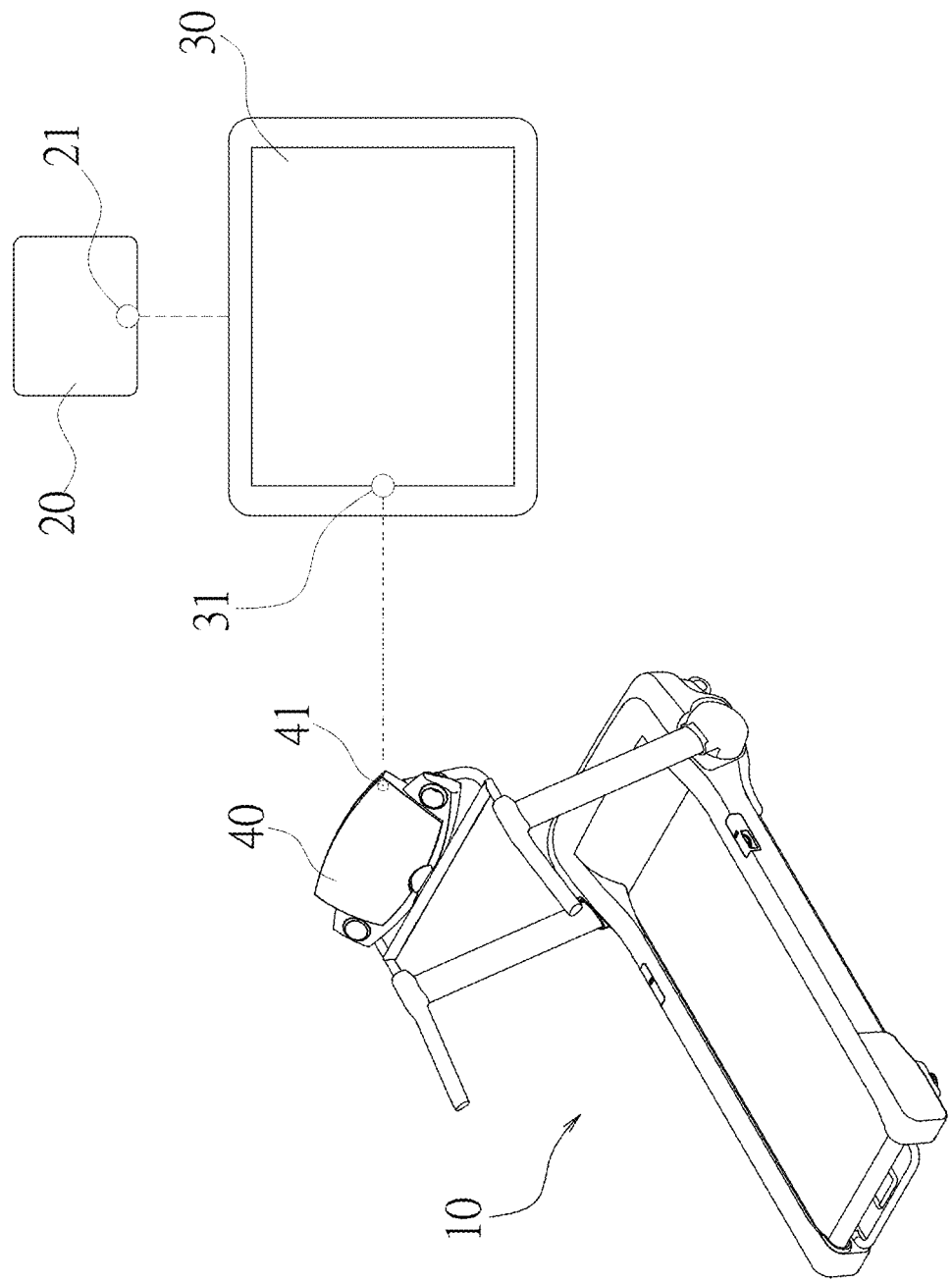

CONTROL ARRANGEMENT OF AN EXERCISE EQUIPMENT

BACKGROUND OF THE INVENTION

1. Fields of the Invention

The invention relates to a control arrangement of an exercise equipment, and more particularly, to a control arrangement acting in concert with a portable electronic unit to create an extra personal exercise session.

2. Description of the Related Art

Nowadays, almost everyone has portable electronic devices, such as laptops, smart phones, tablet PCs, smart watches, mobile hard disks, PDA, etc. These are inseparable from the daily life. Therefore, all kinds of industry should try to find an important direction for a further application and expansion of these portable electronic devices, Normally, an "electronic control panel" is applied to control the operation of all kinds of exercise apparatuses (such as electric fitness bikes, electric treadmills, electric ellipticals, electric rowers, etc.). These apparatuses can include a built-in management program to input the personal physiological parameters for acquiring a better exercise session, thereby assisting the operator to achieve an expected exercise effect and requirement. Generally, the "electronic control panel" is mounted on a specific exercise apparatus so that the operator can fulfill the so-called exercise management only at a specific place with a specific exercise apparatus. Once the operator is not located at the specific place or do not use the specific exercise apparatus, he has to get another exercise apparatus and to input his personal physiological parameters again to acquire the better exercise session suitable for him and to execute the so-called personal exercise management. As a result, much inconvenience is caused.

SUMMARY OF THE INVENTION

An object of the invention is to provide a control arrangement of an exercise equipment. The fact that everyone has a portable electronic unit now is utilized in the invention. After a specially designed exercise management APP-program is downloaded to the portable electronic unit, a personal exercise management process can be continuously conducted by use of an electronic control panel on the exercise apparatus over a corresponding and compatible data transmission unit and an exercise management APP-program after an exercise apparatus with the same exercise management APP-program is found, no matter where the operator is located. In this way, the control arrangement of an exercise equipment can meet the actual needs and ensure its convenient use.

According to the invention, a control arrangement of an exercise equipment includes at least one apparatus for measuring the physiological data, a portable electronic unit, and an electric exercise apparatus. The apparatus for measuring the physiological data includes a data output unit. The portable electronic unit includes a data transmission unit having the input/output function. An exercise management APP-program is built in the portable electronic unit. The exercise apparatus includes an electronic control panel with a data transmission unit and a corresponding exercise management APP-program. Once the apparatus for measuring the physiological data gets the basic physiological data (such as weight or heart rate) of a certain person, these will be immediately transmitted to the portable electronic unit. Meanwhile, an extra exercise session for the certain person will be created by the exercise management APP-program built within the portable electronic unit according to the personal physiological parameters. Thereafter, the extra exercise session will be transmitted to the electronic control panel so that the electronic control panel can control the exercise apparatus to run the above-mentioned exercise session

BRIEF DESCRIPTION OF THE DRAWINGS

The accomplishment of this and other objects of the invention will become apparent from the following description and its accompanying drawing of which:

FIG. 1 is a simplified view of a preferred embodiment of the invention.

DETAILED DESCRIPTION OF THE PREFERRED EMBODIMENT

The present invention will now be described in more detail hereinafter with reference to the accompanying drawings that show various embodiments of the invention.

Referring to FIG. 1, the control device according to the invention is applied to a specific exercise apparatus 10 which is shown as an electric treadmill in FIG. 1. The invention includes at least one apparatus 20 for measuring the physiological data, a portable electronic unit 30, and an electric exercise apparatus 10.

The apparatus 20 for measuring the physiological data includes a data output unit 21. The apparatus 20 for measuring the physiological data can be a body weight scale or a heartbeat detector. The measured data is transmitted through the wired or wireless transmission technology.

The portable electronic unit 30 includes a data transmission unit 31 having the input/output function. An exercise management APP-program is built in the portable electronic unit 30. The portable electronic unit 30 is selected from a group consisting of a laptop, a smart phone, a tablet PC, a smart watch, a mobile hard disk, PDA, etc. which is fitted with a microprocessor (not shown) and a memory (not shown). In addition to receiving the basic parameters transmitted by the apparatus 20 for measuring the physiological data, the portable electronic unit 30 can execute and compute the exercise management APP-program to obtain an optimal exercise session for output through the wired or wireless transmission technology.

The exercise apparatus 10 includes an electronic control panel 40. Also, a data transmission unit 41 and a corresponding exercise management APP-program are built in the electronic control panel 40. Moreover, the electronic control panel 40 also has a microprocessor (not shown) and a memory (not shown) for receiving and executing the optimal exercise session transmitted by the portable electronic unit 30.

Once the apparatus 20 for measuring the physiological data gets the basic physiological data of a certain person, these will be immediately transmitted to the portable electronic unit 30. Meanwhile, an extra exercise session for the certain person will be created by the exercise management APP-program built within the portable electronic unit 30 according to the personal physiological parameters. Then, the extra exercise session will be transmitted to the electronic control panel 40 so that the electronic control panel 40 can control the exercise apparatus 10 to run the above-mentioned exercise session.

The above-mentioned exercise management APP-program belongs to the computer program and is not the object of the invention so that no further descriptions are given hereinafter.

When the certain person runs the exercise session on the exercise apparatus 10, it will be recorded by the electronic control panel 40 and transmitted back to the portable electronic unit 30 to be saved in the exercise management APP-program as reference data for the next operation.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A control arrangement of an exercise equipment, comprising:

an apparatus for measuring the physiological data having a data output unit, wherein the measured data is transmitted through the wired or wireless transmission technology;

a portable electronic unit having a data transmission unit and a built in exercise management APP-program, the portable electronic unit being fitted with a microprocessor and a memory, wherein in addition to receiving the basic parameters transmitted by the apparatus for measuring the physiological data, the portable electronic unit can execute and compute the exercise management APP-program to obtain an optimal exercise session for output through the transmission technology; and an exercise apparatus having an electronic control panel with a data transmission unit and a corresponding exercise management APP-program, the electronic control panel further having a microprocessor and a memory for receiving and executing the optimal exercise session transmitted by the portable electronic unit, wherein, once the apparatus for measuring the physiological data gets the basic physiological data of a certain person, these will be immediately transmitted to the portable electronic unit; meanwhile, an extra exercise session for the certain person will be created by the exercise management APP-program built within the portable electronic unit according to the personal physiological parameters; thereafter, the extra exercise session will be transmitted to the electronic control panel so that the electronic control panel can control the exercise apparatus to run the above-mentioned exercise session.

2. The control arrangement of an exercise equipment as recited in claim 1, wherein, when the exercise session runs on the exercise apparatus, it will be recorded by the electronic control panel and transmitted back to the portable electronic unit to be saved in the exercise management APP-program as reference data for the next operation.

* * * * *